United States Patent Office 3,124,565
Patented Mar. 10, 1964

---

3,124,565
WATER-INSOLUBLE BENZIMIDAZOLONE MONO-AZO-DYESTUFFS
Karl Schilling, Frankfurt am Main, and Erich Dietz, Kelkheim, Taunus, Germany, assignors to Farbwerke Hoechst Aktiengesellschaft vormals Meister Lucius & Brüning, Frankfurt am Main, Germany, a corporation of Germany
No Drawing. Filed Feb. 28, 1961, Ser. No. 92,163
Claims priority, application Germany Mar. 5, 1960
6 Claims. (Cl. 260—157)

The present invention relates to new water-insoluble monoazo-dyestuffs and to a process for preparing them; more particularly it relates to new dyestuffs of the following general formula

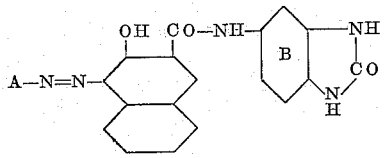

wherein A represents a radical of the benzene series which may be substituted in the benzene nucleus by groups which do not impart solubility in water, and the benzene nucleus B may be substituted by alkyl or alkoxy groups or by halogen atoms.

We have found that valuable water-insoluble azo-dyestuffs which possess a particular fastness to light and solvents and correspond to the following general formula

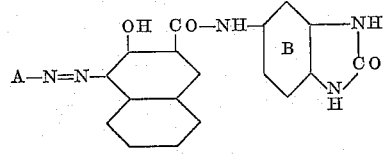

wherein A represents a radical of the benzene series which may be substituted in the benzene nucleus by groups which do not impart solubility in water, and the benzene nucleus B may be substituted by alkyl or alkoxy groups or by halogen atoms, are obtained by coupling the diazo compounds of amines of the benzene series which in the benzene nucleus may be substituted by groups which do not impart solubility in water, with 5-(2',3'-hydroxynaphthoyl-amino)-benzimidazolones which may be substituted in the benzene nucleus of the benzimidazolone radical by alkyl or alkoxy groups or halogen atoms.

The dyestuffs can be produced in substance, on the fiber or on another substratum. For this purpose, primary amines of the benzene series such, for example, as amino-benzene, 1-amino-2-fluorobenzene, 1-amino-2-chlorobenzene, 1-amino-4-chlorobenzene, 1-amino-3-bromobenzene, 1-amino-3-iodobenzene, 1-amino-2-methylbenzene, 1-amino-4-methylbenzene, 1-amino-2-methoxybenzene, 1-amino-2-nitrobenzene, 1-amino-3-nitrobenzene, 1-amino-4-nitrobenzene, 1-amino-benzene-2-carboxylic acid methyl ester, 1-amino-2,4-dimethylbenzene, 1-amino-2-methyl-4-chlorobenzene, 1-amino-2-methyl-5-chlorobenzene, 1-amino-2-methyl-4-nitrobenzene, 1-amino-2-methoxy-4-chlorobenzene, 1-amino-2-methoxy-5-chlorobenzene, 1-amino-2-methoxy-4-nitrobenzene, 1-amino-2-nitro-4-methylbenzene, 1-amino-2-nitro-4-methoxybenzene, 1-amino-2-nitro-4-acetaminobenzene, 1-amino-2,5-dichlorobenzene, 2-amino-4,4'-dichloro-diphenylether, 1-amino-2,4,5-trimethylbenzene, 3-amino-benzoic acid amide, 3-amino-4-methoxy-benzoic acid amide, 3-amino-benzoic acid methyl amide, 3-amino-benzoic acid anilide, 3-amino-4-methoxy-benzoic acid anilidine, 3-amino-4-methoxybenzoic acid-2'-methyl-3'-chloroanilide, 4-amino-benzoic acid anilide, 4-amino-benzoic acid amide, 4-amino-benzoic acid methyl amide are diazotized in the usual manner and coupled in an alkaline, neutral or acid medium, preferably in a neutral to weakly acid medium, with the 2',3'-hydroxynaphthoyl compound of 5-amino-benzimidazolone.

Instead of the 2',3'-hydroxynaphthoyl compound of 5-amino-benzimidazolone, there may also be used the corresponding derivatives which are substituted in the benzene nucleus of the benzimidazolone radical by alkyl groups, alkoxy groups or halogen atoms, such, for example, as 5-(2',3'-hydroxynaphthoylamino)-6-chloro-benzimidazolone, 5-(2',3'-hydroxynaphthoylamino)-7-chloro-benzimidazolone, 5-(2',3'-hydroxynaphthoylamino)-6-methyl-benzimidazolone, 5-(2',3'-hydroxynaphthoylamino)-7-methyl-benzimidazolone, 5-(2',3'-hydroxynaphthoylamino)-6-ethoxy-benzimidazolone or 5-(2',3'-hydroxynaphthoylamino)-7-bromo-benzimidazolone.

The coupling components used in the process of the present invention for the preparation of the monoazo-dyestuffs can be prepared by known methods for example, by reacting the 2,3-hydroxynaphthoic acid chloride with a 5-amino-benzimidazolone, which may be substituted, in a solvent which is suitable for this reaction such, for example, as toluene or pyridine.

Sometimes it proves to be expedient that the coupling for preparing the pigments is carried out in a manner such that the diazo compound is introduced first into the reaction vessel in an aqueous medium. After the addition of sodium acetate, an alkaline solution of the coupling component is then added, or a buffer mixture of sodium acetate and acetic acid is used first and the diazo compound and the alkaline solution of the coupling component are then added simultaneously.

The dyestuffs which are obtained by the process of the present invention sometimes possess a hard grain and, in order to produce the full tinctorial strength, they can be heated in the form of an aqueous paste, if desired with the addition of an organic solvent, under elevated pressure, at a temperature exceeding 100° C., preferably 120° C. to 180° C., or subjected in the for mof the aqueous paste or the dry dyestuff, to an after-treatment with organic solvents. In this case, the application of compounds such, for example, as pyridine, dimethylformamide, N-methylacetamide, 1,2-dichlorobenzene or phosphoric acid tris-dimethylamide, if desired at an elevated temperature, proved to be expedient.

This after-treatment can be avoided by carrying out the coupling at elevated temperature, preferably between 50° C. and 90° C. or in the presence of anionic, cationic or non-ionic emulsifiers such, for example, as the sodium salt of paraffin-sulfamido-acetic acid (the basic paraffin radical corresponding to a hydrocarbon fraction having a boiling range from 180° C. to 210° C.), the sodium salt of the sulfuric acid ester of the reaction product from 2,4,6-tributylphenol and ethylene oxide, or oleylamino-acetate, distearyl-dimethyl-ammonium chloride, or the reaction product from 1 mol of oleyl alcohol and 30 mols of ethylene oxide, or mixtures of emulsifiers, or by treating the dyestuff, after completion of the coupling, at elevated temperature, in aqueous suspension, with a water-insoluble organic solvent, if desired in the presence of an emulsifier.

The new monoazo-dyestuffs are water-insoluble pigments which are distinguished by a very good fastness to solvents and light. They are suitable for the preparation of printing colors and color lakes. They can also be used for coloring caoutchouc, natural resins, and synthetic resins obtained by polymerisation and condensation, more particularly, however, for fast coloring polyvinyl chloride. Furthermore, the products obtainable by the process of the present invention can be used for coloring spinning solutions.

The following examples serve to illustrate the invention but they are not intended to limit it thereto, the parts and percentages being by weight unless otherwise stated and the relationship of parts by weight to parts by volume being the same as that of the kilogram to the liter.

Example 1

12.1 parts of 3-amino-4-methoxy-benzoic acid anilide were dissolved in 125 parts by volume of ice water and 63 parts by volume of 2 N-hydrochloric acid and diazotized with 25 parts by volume of a 2 N-sodium nitrite solution. 30 parts by volume of 2 N-acetic acid, 40 parts by volume of a 2 N-sodium acetate solution and 5 parts by volume of a 10% aqueous solution of an emulsifying agent, for example the reaction product from 1 mol of oleyl alcohol and 30 mols of ethylene oxide were then added to the diazo solution, and the whole was diluted with ice water to a volume of 500 parts.

To this diazo solution which, if necessary, had been clarified by filtration, the alkaline solution of the coupling component was dropped in under the surface at temperatures below 10° C., while quickly stirring. This alkaline solution was prepared by dissolving 16.5 parts of 5-(2′,3′-hydroxynaphthoylamino)-benzimidazolone in 300 parts by volume of water and 65 parts by volume of a 2 N-sodium hydroxide solution, by adding 2 parts by volume of the above-mentioned solution of emulsifying agent and by diluting with water to 500 parts by volume. The dropping in took about 1 hour and immediately after the coupling to a red dyestuff was complete.

3 parts of an emulisifier-oil-mixture (i.e. a mixture prepared from 60 parts of the sodium salt of paraffin-sulfamido acetic acid—the basic paraffin radical corresponding to a hydrocarbon fraction in the boiling range of 180° C. to 210° C.—and 40 parts of spindle oil) were added to the coupling mixture which, while stirring, was heated to 95° C. to 100° C. by introducing steam; then the dyestuff was filtered off. After washing out with water and drying at 60° C., 33 parts of a clear bluish-red pigment of unobjectionable fastness to oil, very good fastness to light and solvents as well as of very good fastness to bleeding in polyvinylchloride were obtained.

Sometimes the dyestuff was obtained in a hard grain form of poor tinctorial strength. In this case, the dyestuff was stirred for 2 hours, at boiling temperature, with 200 parts by volume of pyridine. It swelled to a thick pulp which, however, could still be stirred. After diluting with the same volume of water, the dyestuff was filtered off with suction or the pyridine was distilled off in vacuo or driven off with steam. After washing out and drying, the dyestuff was obtained in a soft grain form of very high tinctorial strength.

Example 2

34 parts of 5-(2′,3′-hydroxynaphthoylamino)-benzimidazolone were dissolved at normal temperature in 470 parts by volume of water and 130 parts by volume of a 2 N-sodium hydroxide solution. 40 parts by volume of a 10% aqueous solution of the sodium salt of the condensation product from oleic acid chloride and N-methyl-taurine and 150 parts by volume of a 2 N-sodium acetate solution were added to the solution; by the addition of ice, the temperature was adjusted to 10° C. to 15° C. and the coupling component was precipitated in a finely divided state by acidifying, while quickly stirring, with 150 parts by volume of 2 N-acetic acid.

Subsequently, the diazo solution prepared at 5° C. to 10° C. from 24.2 parts of 3-amino-4-methoxy-benzoic acid anilide, by using 200 parts by volume of 2 N-hydrochloric acid and 50 parts by volume of a 2 N-sodium nitrite solution was added in the course of about 30 minutes. After stirring for two hours, at 15° C., the coupling was complete.

5 parts of the emulsifier-oil-mixture mentioned in Example 1 were then added to the coupling mixture which, while stirring, was heated to 120° C. in an autoclave made of V2A-steel. After cooling, the dyestuff was filtered off, thoroughly washed out and dried at 60° C. 63 parts of dyestuff were obtained. The red pigment thus obtained possessed a soft grain and a high tinctorial strength and its properties corresponded exactly to that of the product obtained as described in Example 1.

Example 3

12.1 parts of 3-amino-4-methoxy-benzoic acid-anilide were diazotized by using 100 parts by volume of 2 N-hydrochloric acid, 100 parts by volume of ice water and 25 parts by volume of a 2 N-sodium nitrite solution. 75 parts by volume of a 2 N-sodium acetate solution and 5 parts by volume of a 10% aqueous solution of a reaction product from oleyl alcohol and ethylene oxide were added to the clear diazo solution; by the addition of ice, the temperature was adjusted to 10° C.

The alkaline solution of the coupling component obtained by dissolving, at normal temperature, 19 parts of 5-(2′,3′-hydroxynaphthoylamino)-7-chloro-benzimidazolone in 200 parts of water and 65 parts by volume of a 2 N-sodium hydroxide solution and by adding 2 parts by volume of a 10% aqueous solution of the above-mentioned emulsifying agent was added dropwise to the diazo solution, while quickly stirring. Finally, the solution was diluted with ice water to a volume of 500 parts. When the dropping in was complete, the coupling was also terminated.

5 parts of the emulsifier-oil-mixture mentioned in Example 1 were added to the red coupling mixture which, with steam, was heated to 95° C. to 100° C.; after 15 minutes, the dyestuff was filtered off, washed out with water and dried at 60° C.

32 parts of a hard grain red pigment of insufficient tinctorial strength were obtained. By treating the pigment for 2 hours at boiling temperature with 200 parts by volume of pyridine and by isolating the dyestuff in the manner described in Example 1, there were obtained 28 parts of a soft grain carmine red dyestuff of high tinctorial strength, of a clear shade and very good fastness properties, especially to solvents, to light and to bleeding in polyvinylchloride.

Example 4

From 12.1 parts of 3-amino-4-methoxy-benzoic acid-anilide the diazo solution was prepared as described in Example 3 and coupled as indicated in said example with a solution of 18.5 parts of 5-(2′,3′-hydroxynaphthoylamino)-6-chloro-benzimidazolone in 200 parts by volume of water and 65 parts by volume of a 2 N-sodium hydroxide solution to which 2 parts by volume of a 10% aqueous solution of a reaction product from oleyl alcohol and ethylene oxide as emulsifying agent had been added. The coupling was at once complete; the pH-value of the mixture was about 6.

After the addition of 3 parts of the emulsifier-oil-mixture described in Example 1, the whole was heated to 95° C. to 100° C. The red dyestuff was filtered off, washed and dried at 60° C.

32 parts of a hard grain pigment of poor tinctorial strength were obtained which, by after-treatment with 200 parts by volume of pyridine, were converted at boiling temperature in the manner described in Example 1 into a soft grain form of high tinctorial strength.

The carmine red dyestuff was distinguished by very good fastness properties, especially by high fastness to solvents, to light and to migration.

Example 5

Into the diazo solution of 12.1 parts of 3-amino-4-methoxy-benzoic acid-anilide, prepared according to Example 3, the solution of the passive component was dropped under the surface, while quickly stirring. The solution of the passive component was obtained by dissolving at normal temperature 17.5 parts of 5-(2',3'-hydroxynaphthoyl-amino)-6-methyl-benzimidazolone in 300 parts by volume of water and 85 parts by volume of a 2 N-sodium hydroxide solution. The coupling was complete at 10° C. immediately after the addition of the passive component.

3 parts of the emulsifier-oil-mixture mentioned in Example 1 were added to the coupling mixture which, while stirring, was heated to 95° C. by introducing steam. After 15 minutes, the ruby red dyestuff was filtered off, washed thoroughly and dried at 60° C.

33 parts of a ruby red pigment of high tinctorial strength and very good fastness properties, especially of good fastness to solvents, were obtained.

*Example 6*

From 12.1 parts of 3-amino-4-methoxy-benzoic acid anilide, 125 parts by volume of water, 63 parts by volume of 2 N-hydrochloric acid and 25 parts by volume of a 2 N-sodium nitrite solution a diazo solution was prepared in the usual manner and, if necessary, filtered off. 30 parts by volume of 2 N-acetic acid, 40 parts by volume of a 2 N-sodium acetate solution as well as 5 parts by volume of a 10% aqueous solution of a reaction product from oleyl alcohol and ethylene oxide were added.

Into the above diazo solution the solution of 19 parts of 5-(2',3'-hydroxynaphthoylamino) - 6 - ethoxy-benzimidazolone in 400 parts of water, 65 parts by volume of 2 N-sodium hydroxide solution and 2 parts by volume of a 10% solution of the above-mentioned emulsifying agent was dropped at 10° C. under the surface, in the course of about 1 hour, while quickly stirring. When the dropping in was complete, the coupling was likewise terminated.

The red coupling mixture was heated with steam to 95° C. The dyestuff was filtered off, washed out and dried at 60° C.

32 parts of a hard grain pigment of poor tinctorial strength were obtained which, by treatment with 250 parts by volume of pyridine, was converted, at boiling temperature, into the soft grain form of high tinctorial strength according to Example 1. The pigment was distinguished by a high fastness to solvents.

*Example 7*

29 parts of 3-amino-4-methoxy-benzoic acid-2'-methyl-3'-chloro-phenylamide were dissolved with 130 parts by volume of 2 N-hydrochloric acid in 400 parts by volume of ice water and diazotized with 50 parts of a 2 N-sodium nitrite solution. 100 parts by volume of a 2 N-acetate solution, 60 parts by volume of 2 N-acetic acid and 10 parts by volume of a 10% aqueous solution of an emulsifying agent obtained by reacting oleyl alcohol with ethylene oxide were then added to the diazo solution which, if necessary, had been clarified.

Into the above diazo solution the solution of 34 parts of 5 - (2',3' - hydroxynaphthoylamino)-benzimidazolone in 130 parts by volume of a 2 N-sodium hydroxide solution, 600 parts of water and 4 parts by volume of the solution of the above-mentioned emulsifying agent was dropped under the surface in the course of about 1 hour, while quickly stirring. At 10° C., the coupling was at once complete. 4 parts of the emulsifier-oil-mixture mentioned in Example 1 were then added to the coupling mixture which was heated to 95° C. to 100° C. while stirring. After 15 minutes, the red dyestuff was filtered off, washed and dried at 60° C.

62 parts of a red pigment were obtained which, by treatment with 350 parts by volume of pyridine was converted in the manner described in Example 1 at boiling temperature into the soft grain form of high tinctorial strength. 57 parts of a carmine red dyestuff were thus obtained which was distinguished by a very good fastness to light, to solvents and to migration.

*Example 8*

68 parts of 4-amino-benzoic acid-amide were dissolved in 1000 parts by volume of 2 N-hydrochloric acid and 500 parts by volume of ice water and diazotized, at 5° C., with 250 parts by volume of a 2 N-sodium nitrite solution. 375 parts by volume of a 2 N-sodium acetate solution and 50 parts by volume of a 10% aqueous solution of an emulsifying agent obtained by reacting 1 mol of oleyl alcohol with 30 mols of ethylene oxide were added to the clear diazo solution.

At 5° C., the solution prepared from 85 parts of 5-(2',3'-hydroxynaphthoylamino)-benzimidazolone in 2000 parts by volume of ice water, 325 parts by volume of 2 N-sodium hydroxide solution and 10 parts by volume of a 10% solution of the above-mentioned emulsifying agent were dropped in, advantageously under the surface, while quickly stirring.

After the addition of the coupling component, the coupling was at once complete. 20 parts of the emulsifier-oil-mixture described in Example 1 were added to the coupling mixture which was heated to 95° C. to 100° C. by introducing steam. The brown colour of the mixture turned into scarlet red. After about 20 minutes, the dyestuff was filtered off, thoroughly washed out with water and dried at 60° C.

Without any further treatment, 250 parts of a red pigment of high tinctorial strength and possessing an excellent fastness to organic solvents were obtained.

*Example 9*

150 parts by volume of a 2 N-sodium acetate solution and 10 parts by volume of a 10% aqueous solution of an emulsifying agent obtained by reacting 1 mol of oleyl alcohol with 30 mols of ethylene oxide were added to the diazo solution prepared in usual manner, from 21.2 parts of 4-amino-benzoic acid anilide by using 200 parts by volume of 2 N-hydrochloric acid and 50 parts by volume of 2 N-sodium nitrite solution.

At 5° C., the solution of 34 parts of 5-(2',3'-hydroxynaphthoylamino)-benzimidazolone in 130 parts by volume of 2 N-sodium hydroxide solution, 800 parts by volume of water and 4 parts by volume of the above-mentioned emulsifying agent was added dropwise, advantageously under the surface, while quickly stirring. After having dropped in the solution, in the course of about 1 hour, the coupling was complete at 5° C. and at a pH-value of 6.

4 parts of the emulsifier-oil-mixture mentioned in Example 1 were added to the mixture which, while stirring, was heated to 95° C. to 100° C.; the brownish-red dyestuff was filtered off. After washing out and drying at 60° C., 64 parts of a hard grain pigment of poor tinctorial strength were obtained which, by after-treatment with 400 parts by volume of hot pyridine, was converted into the soft grain form of high tinctorial strength, as described in Example 1. 55 parts of a brown-red dyestuff distinguished by a very good fastness to organic solvents were obtained.

By using in this Example 15 parts of 4-amino-benzoic acid-methyl amide instead of 4-amino-benzoic acid anilide and by otherwise proceeding as described above, 53 parts of a brown-red dyestuff were obtained.

*Example 10*

150 parts by volume of a 2 N-sodium acetate solution and 10 parts by volume of a 10% aqueous solution of the emulsifying agent from oleyl alcohol and ethylene oxide were added, at 5° C., to the diazo solution prepared from 21.1 parts of 3-amino-benzoic acid anilide by using 200 parts by volume of 2 N-hydrochloric acid and 50 parts by volume of 2 N-sodium nitrite solution.

The solution of 34 parts of 5-(2',3'-hydroxynaphthoyl-amino)-benzimidazolone in 800 parts by volume of water and 130 parts by volume of a 2 N-sodium hydroxide solution as well as 4 parts by volume of the solution of the above-mentioned emulsifying agent were dropped into the diazo solution, at 5° C., in the course of about 1 hour, while quickly stirring. After the dropping in, the coupling was complete. 4 parts of the emulsifier-oil-mixture mentioned in the above examples were added to the mixture which, while stirring, was heated to 95° C. to 100° C.; this temperature was maintained for 30 minutes and the red dyestuff was filtered off. After washing and drying, 62 parts of a yellowish-red pigment were obtained which, by treatment with 500 parts by volume of pyridine, was converted into the soft grain form of high tinctorial strength according to the process described in Example 1. 50 parts were obtained. This pigment was equally distinguished by an excellent fastness to solvents.

By using in this Example 15 parts of 3-amino-benzoic acid-methyl amide instead of 3-amino-benzoic acid anilide, 42 parts of a pigment having a similar tint and similar properties were obtained.

*Example 11*

68 parts of 3-amino-benzoic acid amide were dissolved in 100 parts by volume of 2 N-hydrochloric acid and 100 parts by volume of ice water and diazotized, at 5° C., with 25 parts by volume of a 2 N-sodium nitrite solution. 75 parts by volume of a 2 N-sodium acetate solution and 5 parts by volume of a 10% solution of an emulsifying agent obtained by reacting oleyl alcohol with ethylene oxide were added to the clear diazo solution.

The solution of 17 parts of 5-(2',3'-hydroxynaphthoyl-amino)-benzimidazolone in 400 parts by volume of water, 65 parts by volume of 2 N-sodium hydroxide solution and 2 parts by volume of the above-mentioned emulsifying agent were dropped into the above diazo solution, advantageously under the surface, while quickly stirring. With the addition of the passive component, the coupling was complete at 5° C. and at a pH-value of 6. 2 parts of the emulsifier-oil-mixture mentioned in Example 1 were added to the mixture which, while stirring, was heated to 95° C. to 100° C.; the dyestuff was filtered off, washed out and dried at 60° C.

28.5 parts of a brownish-red pigment having a poor tinctorial strength and a hard grain were obtained.

For the conversion into the form of high tinctorial strength, the dyestuff was heated for 1 hour to 120° C. with 75 parts by volume of phosphoric acid tris-dimethyl-amide, while stirring. On heating, the dyestuff was first dissolved; at about 100° C., however, it re-precipitated. After the conversion being complete, the dyestuff was diluted with the same volume of water, some sodium chloride solution was added and, after cooling, the dyestuff was filtered off. After washing out and drying, 23.5 parts of a pigment of high tinctorial strength and of soft grain having an excellent fastness to solvents were obtained.

*Example 12*

From 8.3 parts of 3-amino-4-methoxy-benzoic acid amide the diazo solution was prepared and coupled with the solution of 17 parts of 5-(2',3'-hydroxynaphthoyl-amino)-benzimidazolone in the same manner as described in Example 11.

After filtering off the coupling mixture heated to 95° C. to 100° C., 32.5 parts of a bluish-red pigment were obtained which, by treatment at boiling temperature with 250 parts by volume of pyridine, was converted into the form of high tinctorial strength as described in Example 1. 27 parts of a pigment of very good general fastness properties and excellent fastness to solvents were obtained.

*Example 13*

Cotton yarn was treated for 45 minutes at 33° C. at a goods-to-liquor ratio of 1:20 in an impregnation bath, prepared as described below, then squeezed off, dried and dyed at 20° C. in a developing bath prepared as described below. The yarn was then squeezed off and, after an air passage for 1 minute, treated for 5 seconds first with water of 70° C. to 80° C. and then, equally for 5 seconds, in a bath containing, per liter, 3 cc. of hydrochloric acid of 20° Bé. The dyeings thus obtained were soaped and rinsed in the usual manner.

*Impregnation bath.*—14.4 grams of 5-(2',3'-hydroxy-naphthoylamino)-benzimidazolone were pasted up with 50 grams of denatured ethyl alcohol and, after the addition of 15.5 cc. of sodium hydroxide solution of 38° Bé, dissolved in about 1 liter of boiling water and made up to 1 liter.

*Developing bath.*—8.3 grams of 1-amino-2-methoxy-benzene-5-carboxylic acid amide or 12.1 grams of 1-amino-2-methoxy-benzene-5-carboxylic acid phenylamide or 14.5 grams of 1-amino-2-methoxy-benzoic acid-3'-chloro-2'-methyl-phenylamide were diazotized, in the cold, in known manner, with 20.5 cc. of hydrochloric acid of 20° Bé, and 4 grams of sodium nitrite dissolved in water.

When the diazotization was complete, the solution was made up to 1 liter with 15 grams of dissolved sodium acetate and 2 grams of a commercial condensation product of 20% strength obtained by reacting 1 mol of dodecyl alcohol with 30 mols of ethylene oxide.

The bluish-red dyeings thus obtained possessed an excellent fastness to organic solvents.

*Example 14*

A diazo solution of 24.2 parts of 3-amino-4-methoxy-benzoic acid anilide was coupled in the manner described in Example 1 with 39 parts of 5-(2',3'-hydroxynaphthoyl-amino)-7-chloro-benzimidazolone, after completion of the coupling the dyestuff was filtered off with suction and washed with water.

The wet filter cake was introduced, while stirring, into 1000 parts by volume of chlorobenzene in a closed stirring vessel provided with descending cooler. The mixture was heated in a heating bath, while stirring, and the water was distilled over in admixture with chlorobenzene until an inner temperature of 132° C. was reached and pure chlorobenzene passed over.

The main portion of the chlorobenzene was then distilled off under reduced pressure and the residue was separated by distillation with steam. After suction-filtration and drying of the dyestuff at 60° C., 66 parts of a red pigment possessing a very soft grain and a high tinctorial strength as well as an excellent fastness to light, solvents and bleeding in soft polyvinyl chloride were obtained.

*Example 15*

A diazo solution was prepared from 24.2 parts of 3-amino-4-methoxy-benzoic acid anilide, 200 parts by volume of 2 N-hydrochloric acid, 200 parts of ice and 50 parts by volume of a 2 N-sodium nitrite solution, the solution was clarified and freed from nitrous acid in excess and then made up to 500 parts by volume with water.

39 parts of 5-(2'-3'-hydroxynaphthoylamino)-7-chloro-benzimidazolone were dissolved at room temperature in 150 parts by volume of 2 N-sodium hydroxide solution and 150 parts of water. To this solution were added 3 parts by volume of a 10% aqueous solution of the sodium salt of the condensation product of oleic acid chloride and N-methyl-taurine and the solution was made up to 500 parts by volume with water.

Both solutions were poured at the same time and with equal velocity at room temperature into a rapidly stirred buffer solution of 50 parts by volume of 2 N-acetic acid, 200 parts by volume of a 2 N-sodium acetate solution and 7 parts by volume of a 10% solution of the emulsifier mentioned above.

Shortly after the addition the coupling was complete.

The coupling mixture was stirred for 30 minutes, mixed with 100 parts by volume of ortho-dichlorobenzene, heated at 95° C. to 97° C. by the introduction of steam, and the ortho-dichlorobenzene was expelled by means of steam. When working in a closed apparatus provided with descending cooler, the ortho-dichlorobenzene could be separated and recovered almost completely within 1 hour. The dyestuff was filtered off with suction at 60° C., washed out with water and dried at 60° C.

There were obtained 66 parts of a claret pigment possessing a soft grain and a high tinctorial strength which was distinguished by a very good fastness to light and solvents, an excellent fastness to bleeding in soft polyvinyl chloride and an excellent fastness to overspraying in nitro lacquers and bakeable lacquers.

*Example 16*

19.5 parts of 5-(2',3'-hydroxynaphthoylamino)-7-chlorobenzimidazolone were dissolved in 65 parts by volume of a 2 N-sodium hydroxide solution, 65 parts of water and 15 parts by volume of a 10% aqueous solution of the sodium salt of the condensation product from oleic acid chloride and N-methyltaurine. The solution was made up to 800 parts by volume with water, heated to 85° C. and mixed, while briskly stirring, with 75 parts by volume of 2 N-acetic acid. Into this solution was run within about 10 minutes, while maintaining a temperature of 80° C. to 90° C., a diazo solution prepared from 12.1 parts of 3-amino-4-methoxybenzoic acid anilide, 125 parts by volume of ice water, 63 parts by volume of 2 N-hydrochloric acid and 25 parts by volume of a 2 N-nitrite solution. The coupling was immediately complete. There were added 2 parts by volume of an emulsifier-oil-mixture consisting of a mixture of 60 parts of the sodium salt of paraffin-sulfamide-acetic acid (the basic paraffin radical corresponding to a hydrocarbon fraction having a boiling range from 180° C. to 210° C.), and 40 parts of spindle oil, the whole was heated at 95° C. to 100° C. with steam, while stirring, and the dyestuff was filtered off.

After washing out and drying at 60° C., there were obtained 35 parts of a red pigment possessing a soft grain and a high tinctorial strength which in its properties had a great similarity to the dyestuff obtained at low temperature from the same components and after-treated in the hot with pyridine.

*Example 17*

24.2 parts of 1-amino-6-methoxybenzene-3-carboxylic acid phenyl amide were dissolved in 250 parts by volume of ice water and 125 parts by volume of 2 N-hydrochloric acid and the solution was diazotized with 50 parts by volume of a 2 N-sodium nitrite solution. The clarified diazo solution together with a solution of 36 parts of 5-(2',3' - hydroxynaphthoylamino) - 7 - chlorobenzimidazolone in 400 parts by volume of water and 130 parts by volume of 2 N-sodium hydroxide was dropped within 30 minutes into a mixture of 100 parts by volume of 2N-acetic acid, 100 parts by volume of 4 N-sodium acetate solution and 8 parts of oleylamino-acetate.

The coupling being complete, the aqueous dyestuff suspension was heated for 1 hour at 95° C. to 100° C. by introducing steam and then worked up in the usual manner.

60 to 62 parts of a bluish red pigment dyestuff possessing a high tinctorial strength, and an excellent fastness to light, solvents, overspraying and bleeding were obtained.

When replacing the oleylamino-acetate by distearyl-dimethyl-ammonium chloride, an analoguous product was obtained which, however, was distinguished by a distinctly higher covering power.

When adding to the aqueous dyestuff suspension, after the coupling, a mixture of 30 parts of the sodium salt of paraffin-sulfamido-acetic acid (the basic paraffin radical corresponding to a hydrocarbon fraction having a boiling range from 180° C. to 210° C.) and 100 parts by volume of water, and heating the whole for 1 hour at 95° C. to 100° C., there were obtained 78 to 80 parts of a pigment of high tinctorial strength which colored polyvinyl chloride red violet tints possessing a very good fastness to bleeding.

As regards its tint, this product fundamentally distinguished from that prepared in the presence of oleylamino-acetate or distearyl-dimethyl-ammonium chloride only, which colored polyvinyl chloride bluish red tints. The two substances were also distinguished from each other in the X-ray-diffraction diagram. A similar product was obtained by adding after the coupling 100 parts of 1,2-dichlorobenzene emulsified with 30 parts of the sodium salt of paraffin-sulfamido-acetic acid in water, and heating the whole for 1 hour at 95° C. to 100° C. by introducing steam.

*Example 18*

12.1 parts of 3-amino-4-methoxy-benzoic acid anilide were diazotized with 100 parts by volume of 2 N-hydrochloric acid, 100 parts of ice water and 25 parts by volume of 2 N-sodium nitrite solution. The clarified diazo solution was mixed with 75 parts by volume of 2 N-sodium acetate solution and 10 parts by volume of a 10% aqueous solution of an emulsifier such, for example, as the reaction product from 1 mol of oleyl alcohol and 30 mols of ethylene oxide.

Below the surface of this diazo solution there was run at a temperature ranging from 5° C. to 10° C., while rapidly stirring, a solution of 18.5 parts of 5-(2',3'-hydroxynaphthoylamino)-7-methyl-benzimidazolone in 65 parts by volume of 2 N-sodium hydroxide solution, 250 parts of water and 2 parts by volume of a 10% aqueous solution of the above emulsifier. Shortly thereafter, the coupling was complete.

The coupling mixture was heated to 80° C. with steam, the dyestuff was filtered off with suction and dried.

30 parts of a red pigment possessing a hard grain and a poor tinctorial strength were obtained.

The product was heated, while stirring, for 2 hours under reflux, with 200 parts by volume of pyridine, diluted with the same volume of water, suction-filtered, washed out with hot water and dried at 60° C.

29 parts of a bluish red soft-grain pigment of high tinctorial strength were obtained which possessed a high fastness to light, a very good fastness to solvents and an unobjectionable fastness to bleeding in polyvinyl chloride.

*Example 19*

The diazo solution of 12.1 parts of 3-amino-4-methoxybenzoic acid anilide, 100 parts by volume of 2 N-hydrochloric acid, 100 parts of ice water and 25 parts by volume of 2 N-sodium nitrite solution was made up to 250 parts by volume with water.

21 parts of 5-(2',3'-hydroxynaphthoylamino)-7-bromo-benzimidazolone were dissolved at room temperature in 75 parts by volume of 2 N-sodium hydroxide solution. The solution was mixed with 2 parts by volume of a 10% solution of an emulsifier such, for example, as the reaction product from 1 mol of oleyl alcohol and 30 mols of ethylene oxide, and the whole was also made up to 250 parts by volume with water.

Both solutions were simultaneously run at equal velocity and at room temperature into a rapidly stirred buffer solution consisting of 25 parts by volume of 2 N-acetic acid, 100 parts by volume of 2 N-sodium acetate solution and 3 parts by volume of a 10% solution of the aforementioned emulsifier. Shortly after the addition, the coupling was complete. The whole was stirred for 1 hour, heated at 95° C. with steam, the product was suction-filtered, washed out with water and dried at 60° C.

34 parts of a hard-grain red pigment having an unsufficient tinctorial strength were obtained. To convert this dyestuff into the soft-grain form of high tinctorial strength, it was treated for 3 hours at boiling temperature, while stirring, with 200 parts by volume of pyridine, diluted with the same volume of water and the dyestuff was suction-filtered.

After washing out with hot water and drying at 60° C., 32 parts of a soft-grain red pigment of high tinctorial strength possessing an excellent fastness to light and solvents and an unobjectionable fastness to bleeding in polyvinyl chloride were obtained. After completion of the coupling and heating to 95° C., the dyestuff was suction-filtered and heated while wet for 3 hours at a temperature ranging from 120° C. to 150° C. with 350 parts by volume of ethyl alcohol, cooled, made up to 2000 parts by volume with water, suction-filtered again and dried at 60° C. A soft-grain pigment possessing a high tinctorial strength and similar properties of fastness and like tint was obtained.

*Example 20*

7.6 parts of 2-amino-benzoic acid methyl ester were diazotized in known manner with the use of 100 parts by volume of 2 N-hydrochloric acid and 25 parts by volume of 2 N-sodium nitrite solution. The diazo solution was mixed with 5 parts by volume of a 10% aqueous solution of an emulsifier (reaction product of 1 mol of oleyl alcohol and 30 mols of ethylene oxide) and 100 parts by volume of 2 N-sodium acetate solution.

Into this diazo solution 17 parts of 5-(2',3'-hydroxynaphthoylamino)-benzimidazolone in 65 parts by volume of 2 N-sodium hydroxide solution, 400 parts of water and 2 parts by volume of a 10% aqueous solution of the aforementioned emulsifier were run at 5° C. while rapidly stirring.

After completion of the coupling, the whole was heated to 80° C. with steam, the dyestuff was filtered off with suction, washed out and dried. The dyestuff was heated for 2 hours at 110° C., while stirring and cooling under reflux, with 250 parts by volume of pyridine. It was then suction-filtered at 80° C., washed thoroughly with hot water and dried at 60° C.

25 parts of a red pigment possessing a high tinctorial strength and a very good fastness to light, solvents, overspraying and bleeding in soft polyvinyl chloride were obtained.

*Example 21*

16.2 parts of molten 1-amino-2,5-dichloro-benzene were stirred at 90° C. into 100 parts by volume of 2 N-hydrochloric acid. 30 parts by volume of 10 N-hydrochloric acid were added, while stirring vigorously, the whole was cooled down to 10° C., mixed with 100 parts of ice and diazotized by running rather quickly 50 parts by volume of 2 N-sodium nitrite solution under the surface of the liquid. The whole was stirred for 30 minutes, the nitrous acid in excess was eliminated by means of aminosulfonic acid and the solution was clarified by filtration. The clear slightly yellowish diazo solution was made up to 500 parts by volume with water.

36 parts of 5-(2',3'-hydroxynaphthoylamino)-benzimidazolone were dissolved in 200 parts by volume of 2 N-sodium hydroxide solution. The solution was diluted with 4 parts by volume of a 10% aqueous solution of an emulsifier (reaction product of 1 mol of oleyl alcohol and 30 mols of ethylene alcohol) and made up to 500 parts by volume with water.

Both solutions were run simultaneously and with equal velocity, at 10° C., while stirring rapidly, into a buffer solution of 50 parts by volume of 2 N-acetic acid, 100 parts by volume of 2 N-sodium acetate solution, 100 parts of water and 3 parts by volume of a 10% solution of the emulsifier mentioned above.

After completion of the coupling, 35 parts by volume of 10 N-hydrochloric acid were immediately added and the dyestuff was filtered off with suction. After washing with water and drying, 54 parts of a brown pigment of hard grain and poor tinctorial strength were obtained.

The dyestuff was heated for 2 hours at 110° C. with 360 parts by volume of pyridine while stirring and cooling under reflux. The mixture was diluted with 100 parts by volume of water, the dyestuff was filtered off with suction, washed with hot water until the discharge was colorless, and dried at 60° C.

48 parts of a brown pigment of soft grain and high tinctorial strength were obtained. It was distinguished by a high fastness to light, a good fastness to solvents and a very good fastness to bleeding in polyvinyl chloride.

*Example 22*

16.2 parts of 1-amino-2,5-dichlorobenzene were melted on the steam bath and poured into 50 parts by volume of 2 N-hydrochloric acid which had been previously heated to 95° C. 40 parts by volume of 10 N-hydrochloric acid were then added and the whole was diazotized, after the addition of ice, with 20 parts by volume of a 5 N-sodium nitrite solution.

Furthermore, 33 parts of 5-(2',3'-hydroxynaphthoylamino)-benzimidazolone were dissolved in 400 parts by volume of water and 130 parts by volume of 2 N-sodium hydroxide solution.

The solution of the diazo compound and the solution of the coupling component were then dropped within 20 to 30 minutes at a temperature below 20° C. into a buffer solution consisting of 200 parts by volume of water, 100 parts by volume of 2 N-acetic acid, 100 parts by volume of 4 N-sodium acetate solution and 8 parts of oleylamino acetate. The coupling being complete, the whole was heated for 1 hour at 95° C. to 100° C. by the introduction of steam, and then worked up in usual manner.

53 to 55 parts of a brown pigment dyestuff possessing an excellent fastness to light and a good fastness to solvents, overspraying and bleeding were obtained.

A practically identical product was obtained by using instead of oleylamino acetate the distearyl-dimethyl-ammonium chloride as emulsifier.

*Example 23*

8.4 parts of 1-amino-2-methoxy-5-nitrobenzene were diazotized at 5° C. to 10° C. with 100 parts by volume of 2 N-hydrochloric acid and 25 parts by volume of 2 N-nitrite solution. The diazo solution was clarified and mixed with 75 parts by volume of 2 N-sodium acetate solution and 5 parts by volume of a 10% aqueous solution of an emulsifier (reaction product of 1 mol of oleyl alcohol and 30 mols of ethylene oxide).

Into this solution was run at 10° C. the solution of 17 parts of 5-(2',3'-hydroxynaphtholyamino)-benzimidazolone in 65 parts by volume of 2 N-sodium hydroxide solution, 400 parts of water and 2 parts by volume of a 10% aqueous solution of the emulsifier mentioned above.

The coupling being complete, the mixture was heated to 80° C. to 90° C. by means of steam, the dyestuff was filtered off with suction, washed out and dried.

The dyestuff was heated for 2 hours at 110° C. with 250 parts by volume of pyridine in a vessel provided with stirrer and reflux condenser. The dyestuff was filtered off with suction at about 80° C., washed with hot water until the discharge was colorless, and dried at 60° C.

25 parts of a soft-grain pigment of high tinctorial strength were obtained which yielded claret tints of excellent fastness to light, good fastness to solvents and unobjectionable fastness to beeeding in soft polyvinyl chloride.

*Example 24*

7.6 parts of 1-amino-2-methyl-4-nitrobenzene were diazotized at 5° C. to 10° C. with 100 parts by volume of 2 N-hydrochloric acid and 25 parts by volume of 2 N-sodium nitrite solution. The diazo solution was clarified and mixed with 75 parts by volume of 2 N-sodium acetate solution, 20 parts by volume of 2 N-acetic acid and 5 parts by volume of a 10% aqueous solution of an emulsifier (reaction product of 1 mol of oleyl alcohol and 30 mols of ethylene oxide).

Into this solution was run at 10° C., while stirring vigorously, the solution of 19 parts of 5-(2′,3′-hydroxynaphthoylamino)-6-methyl-benzimidazolone in 85 parts by volume of 2 N-sodium hydroxide solution, 400 parts of water and 2 parts by volume of a 10% aqueous solution of the emulsifier mentioned above.

The coupling being complete, the whole was heated to 80° C. by means of steam, the dyestuff was filtered off with suction, washed out and dried.

The dyestuff was then stirred for 2 hours at 110° C. with 250 parts by volume of pyridine, filtered off with suction while hot, washed with hot water and dried.

27 parts of a soft-grain pigment of good tinctorial strength yielding maroon tints were obtained. The product was distinguished by a very good fastness to light, an excellent fastness to solvents and bleeding in soft polyvinyl chloride.

*Example 25*

15.3 parts of 1-amino-2-methyl-4-nitrobenzene were diazotized in 150 parts by volume of ice water and 60 parts by volume of 5 N-hydrochloric acid with 20 parts by volume of 5 N-sodium nitrite solution. Furthermore, 35 parts of 5-(2′,3′-hydroxynaphtholyamino)-6-methyl-benzimidazolone were dissolved in 400 parts by volume of water and 150 parts by volume of 2 N-sodium hydroxide solution.

The diazo compound and the alkaline solution of the coupling component were then simultaneously dropped within about 20 minutes at 10° C. to 15° C., while vigorously stirring, into a mixture consisting of 150 parts by volume of water, 100 parts by volume of 2 N-acetic acid, 100 parts by volume of 4 N-sodium acetate solution and 8 parts of oleylamino acetate. The coupling was complete immediately after the addition of coupling and diazo component. To the aqueous suspension of the monoazo dyestuff formed, there was added an aqueous emulsion of 100 parts of 1,2-dichlorobenzene prepared by means of 30 parts of the sodium salt of paraffin-sulfamido-acetic acid (the basic paraffin radical corresponding to a hydrocarbon fraction having a boiling range from 180° C. to 210° C.), and the whole was heated for 30 minutes at 95° C. to 100° C. by the introduction of steam. After working up in the usual manner, 72 to 74 parts of a maroon pigment possessing a good fastness to light, solvents and overspraying were obtained.

*Example 26*

15.3 parts of 1-amino-2-methyl-4-nitrobenzene were diazotized, as described in Example 25 and coupled with 35 parts of 5-(2′,3′-hydroxynaphthoylamino)-6-methyl-benzimidazolone. After completion of the coupling, a mixture of 30 parts of the sodium salt of paraffin-sulf-amido-acetic acid (the basic paraffin radical corresponding to a hydrocarbon fraction having a boiling range from 180° C. to 210° C.) and 100 parts by volume of water were added and the whole was heated for 1 hour at 95° C. to 100° C. by introducing steam. After working up in the usual manner, 70 to 72 parts of a maroon pigment possessing a good fastness to light, solvents and overspraying were obtained.

*Example 27*

14.2 parts of 1-amino-2-methyl-5-chlorobenzene were diazotized, at a temperature up to 5° C., with 200 parts by volume of 2 N-hydrochloric acid and 50 parts by volume of a 2 N-sodium acetate solution and 10 parts by volume of a 10% aqueous solution of an emulsifying agent (reaction product from 1 mol of oleyl alcohol with 30 mols of ethylene oxide) were added to the clarified diazo solution.

Into this solution a solution of 35 parts of 5-(2′,3′-hydroxynaphthoylamino)-benzimidazolone in 130 parts by volume of a 2 N-sodium hydroxide solution, 800 parts of water and 4 parts by volume of a 10% solution of the above-mentioned emulsifying agent was introduced, at 10° C., while vigorously stirring.

When the coupling was complete the mixture was heated with steam to 80° C., the dyestuff was filtered off with suction, washed out and dried at 60° C.

The dyestuff was heated to the boil for 2 hours with 400 parts by volume of pyridine, while stirring and reflux condensing. The mixture was then diluted with about the same volume of water and the dyestuff was filtered off with suction. After washing out with hot water and drying at 60° C., 50 parts of a pigment of soft grain and high tinctorial strength were obtained. Its claret red dyeings were distinguished by a very good fastness to light, by a good fastness to solvents and to bleeding in soft polyvinyl chloride.

*Example 28*

8.4 parts of 1-amino-2-methoxy-4-nitrobenzene were diazotized, at temperatures below 10° C., with the use of 100 parts by volume of 2 N-hydrochloric acid and 25 parts by volume of a 2 N-sodium nitrite solution. 75 parts by volume of a 2 N-sodium acetate solution as well as 5 parts by volume of a 10% aqueous solution of an emulsifying agent (reaction product of oleic acid chloride and methyl taurine) were added to the clarified diazo solution.

Into this diazo solution a solution of 17 parts of 5-(2′,3′-hydroxynaphthoylamino)-benzimidazolone in 65 parts by volume of a 2 N-sodium hydroxide solution, 300 parts of water and 2 parts by volume of a 10% aqueous solution of the above-mentioned emulsifying agent was dropped under the surface, at 10° C., while quickly stirring. The coupling was at once complete.

The coupling mixture was heated with steam to 95° C., the dyestuff was filtered off with suction, throughly washed-out with water and dried at 60° C.

30 parts of a violet pigment of moderate tinctorial strength were thus obtained.

The dyestuff was heated for 1 hour to 110° C. with 250 parts by volume of pyridine, while stirring and reflux condensing. After diluting with the same volume of water, it was filtered off with suction at 80° C., washed out with hot water and dried at 60° C.

26 parts of a pigment of soft grain and high tinctorial strength possessing a good fastness to light were obtained.

*Example 29*

16.9 parts of 1-amino-2-methoxy-4-nitrobenzene were diazotized in 150 parts by volume of ice water and 60 parts by volume of 5 N-hydrochloric acid. Besides, 33 parts of 5-(2′,3′-hydroxynaphthoylamino)-benzimidazolone were dissolved in 400 parts by volume of water and 130 parts by volume of 2 N-sodium hydroxide solution.

The diazo compound and the solution of the coupling component were then simultaneously dropped into a mixture of 150 parts by volume of water, 100 parts by volume of 2 N-acetic acid, 100 parts by volume of a 4 N-sodium acetate solution and 8 parts of oleylamino-acetate in the course of about 20 minutes at temperatures below 20° C., while vigorously stirring. When the coupling was complete, an aqueous emulsion of 100 parts of 1,2-dichlorobenzene prepared with the aid of 30 parts of the sodium salt of paraffin-sulfamidoacetic acid (the basic paraffin radical corresponding to a hydrocarbon fraction of the boiling range of 180° C. to 210° C.) was added and the whole was heated for 30 minutes to 95° C. to 100° C. by introducing steam. Subsequently, the dyestuff was worked up in usual manner and 72 to 74 parts of a violet pigment possessing an excellent fastness to light and a good fastness to solvents, to overspraying and to bleeding were obtained.

*Example 30*

7.6 parts of 1-amino-2-methyl-4-nitrobenzene were stirred, at 5° C. to 10° C., with 100 parts by volume of 2 N-hydrochloric acid and diazotized with 25 parts by volume of a 2 N-sodium nitrite solution. 75 parts by volume of a 2 N-sodium acetate solution and 5 parts by volume of a 10% aqueous solution of an emulsifying agent (reaction product from 1 mol of oleyl alcohol and 30 mols of ethylene oxide) were added to the clarified diazo solution.

Into this solution the solution of 17 parts of 5-(2',3'-hydroxynaphthoylamino)-benzimidazolone in 65 parts by volume of 2 N-sodium hydroxide solution, 400 parts by volume of water and 2 parts by volume of a 10% aqueous solution of the above-mentioned emulsifying agent were introduced at 10° C. Shortly after the introduction of the above solution the coupling was complete. The mixture was heated with steam to 70° C. to 80° C., the dyestuff was filtered off with suction, washed out with water and dried.

The dyestuff was heated for 2 hours to 110° C., while stirring, with 250 parts by volume of pyridine, filtered off with suction at 60° C. and washed out with hot water. After drying at 60° C., 20 parts of a pigment yielding claret shades and possessing very good fastness properties, especially a very high fastness to light were obtained.

In the following table are given further combinations of diazo and coupling components obtained by coupling according to the processes described in the above examples; their dyeings possessing a high fastness to light, good fastness to solvents as well as good fastness to bleeding in polyvinyl chloride.

| Diazo component | Coupling component | Tint |
|---|---|---|
| 1-amino-2-chlorobenzene | 5-(2', 3'-hydroxynaphthoylamino)-benzimidazolone. | brown. |
| 1-amino-3-chlorobenzene | ____do____ | red. |
| 1-amino-2-methoxy-4-chlorobenzene. | ____do____ | rubyred. |
| 1-amino-2-methoxy-5-chlorobenzene. | ____do____ | claret. |
| 1-amino-2-methyl-4-chlorobenzene. | ____do____ | Do. |
| 1-amino-2-nitro-4-acetaminobenzene. | ____do____ | Do. |
| 4,4'-dichloro-2-amino-diphenyl ether. | 5-(2',3'-hydroxynaphthoylamino)-7-chlorobenzimidazolone. | red. |
| 1-amino-2-methoxy-4-nitrobenzene. | 5-(2',3'-hydroxynaphthoylamino)-6-chlorobenzimidazolone. | maroon. |
| 1-amino-2-chlorobenzene-5-carboxylic acid amide. | 5-(2',3'-hydroxynaphthoylamino)-benzimidazolone. | brown. |
| 1-amino-2-methylbenzene-5-carboxylic acid amide. | 5-(2',3'-hydroxynaphthoylamino-)-7-chlorobenzimidazolone. | red. |

We claim:
1. The water-insoluble monoazo-dyestuffs having the formula

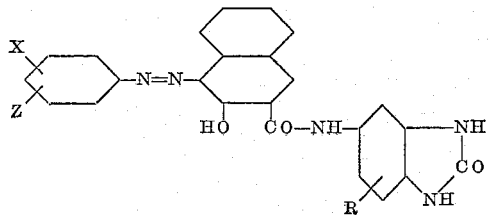

wherein X stands for a member selected from the group consisting of a chlorine atom, a nitro group, a carboxylic acid amide group, a carboxylic acid lower alkyl amide group, a carboxylic acid phenyl amide group, a lower alkyl- and chlorine-substituted carboxylic acid phenyl amide group and a carboxylic acid lower alkyl ester group, Z represents a member selected from the group consisting of a hydrogen atom, a chlorine atom, a lower alkyl group and a lower alkoxy group, and R represents a member selected from the group consisting of a hydrogen atom, a chlorine atom, a bromine atom, a lower alkyl group and a lower alkoxy group.

2. The water-insoluble monoazo-dyestuff having the formula

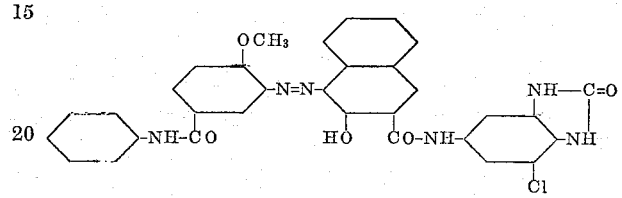

3. The water-insoluble monoazo-dyestuff having the formula

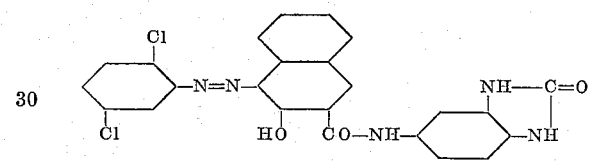

4. The water-insoluble monoazo-dyestuff having the formula

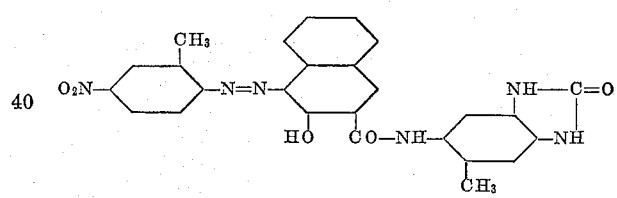

5. The water-insoluble monoazo-dyestuff having the formula

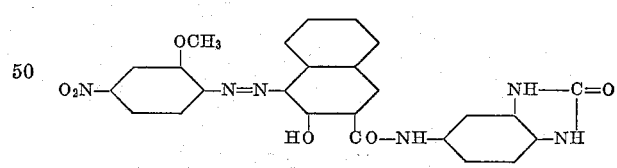

6. The water-insoluble monoazo-dyestuff having the formula

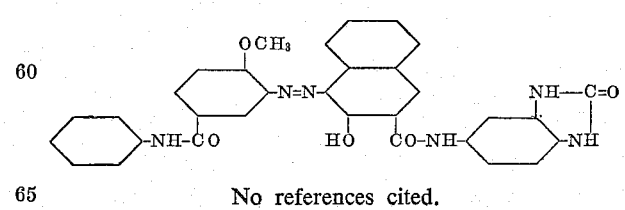

No references cited.